Patented Nov. 27, 1945

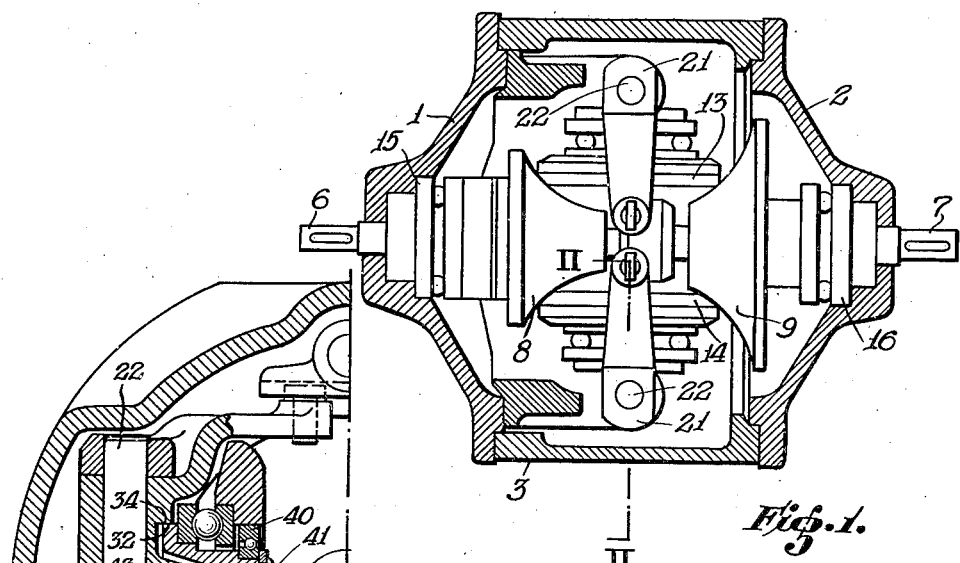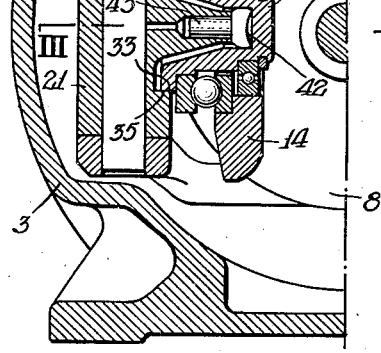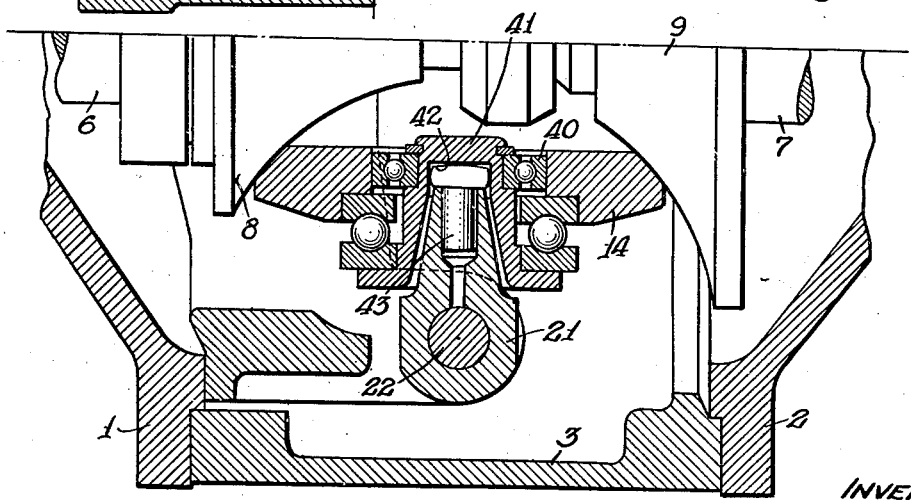

2,389,589

UNITED STATES PATENT OFFICE 2,389,589

FRICTION WHEEL CHANGE SPEED GEAR

Jakob Arter, Mannedorf, Switzerland

Application March 1, 1943, Serial No. 477,569
In Switzerland January 16, 1942

3 Claims. (Cl. 74—200)

The present invention relates to a friction wheel change speed gear of the kind described in my British Patent No. 476,589, comprising a driving and a driven main wheel, the axes of which lie in the same line, and intermediate wheels which are adapted to be tilted about axes which lie outside the plane of the wheels and do not rotate about the axes of said wheels, and which touch the main wheels along concave rolling surfaces. In gears of this type the axes around which the intermediate gears are tiltable are provided in a common body which is able to move in a plane perpendicular to the axis of the driving and of the driven wheel. The said intermediate wheels are also able to adjust themselves freely and relatively to the main wheels in a radial direction, whereby a certain compensation in the load of the various intermediate wheels is attained.

The various intermediate gears are adapted to execute a sliding movement in a plane containing the respective intermediate wheel axis and the axis of the main gears. As usually a considerable pressure occurs, the compensating sliding movement produces a certain amount of friction. This produces undesired effects, especially when the frequency at which these movements occur is rather high. With gears of the type above referred to the compensation movement and the precise control of the number of revolutions is partly prevented by the said friction.

The main object of this invention is to obviate this drawback and this object is attained by securing the adjustment of the intermediate wheel axis in an axial plane containing the main gear axis and the axis of the respective intermediate wheel in such a way that the intermediate gears bear against a cylindrical surface, the generatrix of this surface being perpendicular to the said plane defined by the axis of the intermediate gear and the axis of the main gear. According to this invention the intermediate gears are further provided with an axle bush which is adapted to be tilted on the said cylindrical surface in the said plane about a limited angle. A tilting movement of the said axle bush in a direction perpendicular to the said plane is prevented by parallel guiding surfaces on the intermediate gear axle bush and on the supporting elements for the same.

The drawing shows in a diagrammatical manner a constructional example of a frictional change speed gear according to the invention.

Fig. 1 shows the friction wheel change speed gear partly in axial section.

Fig. 2 is a part of the section on line II—II in Figure 1,

Fig. 3 is a section of a detail on line III—III in Fig. 2.

In the removable end walls 1 and 2 of a housing 3 containing the friction wheels are coaxially journalled in ball bearings 15 and 16 the shafts 6 and 7. The shaft 6 is the driving shaft and shaft 7 is the driven shaft. On the shaft 6 is freely slidable in the axial direction the wheel member 8 which may be coupled to the shaft 6 by a known device.

The wheel member 9 is fixedly secured to the shaft 7. The shafts 6 and 7 project in the axial direction from the thrust bearings 15 and 16 out of the end walls 1, 2 of the housing. The intermediate wheels 13, 14 are freely rotatable by means of ball bearings 40 on hollow axle bushes 41. Each of these bushes 41 bears against the cylindrical surface 42 of a bolt 43. Bolt 43 is mounted in a supporting member or yoke 21 arranged on the axle 22, this axle lying outside the wheels 13 and 14. The intermediate wheels are tiltably mounted on axle 22 supported on a non-rotatable member, as shown in the above mentioned British Patent No. 476,589.

The surface of bush 41 co-acting with the cylindrical surface 42 is plane. The cylindrical surface 42 is preferably disposed in a part of the intermediate wheel between the two end surfaces thereof with the axis of the cylinder intersecting at right angle the axis of the wheel 13 and 14 respectively. The part in which the cylindrical surface 42 is located is circumferentially confined by the working surface of the wheel 13 and 14 respectively. When executing a compensating movement the axis of bush 41 is only to rock in the plane containing the axis of the shafts 6 and 7. The generatrix of the cylindrical surface 42 is perpendicular to the said plane. In order to prevent bush 41 from rocking in a perpendicular direction thereto the opposite end of bush 41 is provided with parallel guiding surfaces 32 and 33 bearing against parallel guiding surfaces 34 and 35 of the supporting member 21. This arrangement allows only a movement of the bush in the plane III—III through the gear axis (see Figure 2).

The intermediate wheels 13 and 14 may be adjusted in any known manner by a common adjusting mechanism for instance as described in the British Patent No. 476,589.

Only very small movements are necessary for pressure compensation and these small movements have no noticeable influence on the number of revolutions. But the adjustment of the number of revolutions is correct right from the beginning, because bush 41 acts as a highly sensitive balance beam which immediately takes the equilibrium position and remains in the same. In the change speed gear described the resistance to a displacement is much smaller than if the intermediate wheels 13 and 14 were bearing against sliding surfaces. The pressure exerted by the wheel member 8 of the driving side of the gear is fully transmitted to the wheel member 9 of the driven gear side without any loss due to sliding friction. No excess pressure of the driving wheel is necessary to cover losses due to friction. As all the internal adjustments occur much easier the change speed gear according to this invention runs much smoother than a gear in which the intermediate gears bear against sliding surfaces.

What I claim is:

1. A change speed gear comprising coaxially disposed driving and driven shafts, driving and driven wheels mounted respectively on said shafts, transmitting wheels disposed between the driving and driven wheels respectively, a yoke on which the intermediate wheels are supported for swinging movement about axes intersecting the axes of said intermediate wheels and forming an angle with the alined axes of the driven and driving wheels, said yoke being oscillatable about a fixed axis and presenting a cylindrical bearing portion whose axis coincides with the swinging axis of the yoke, and a bearing element associated with the intermediate wheels engaging said cylindrical bearing surface associated with the yoke.

2. A change speed gear comprising coaxially disposed driving and driven shafts, driving and driven wheels each having a concave rolling surface, intermediate wheels disposed between said driving and driven wheels and adapted for variable engagement with the concave rolling surfaces of the main wheels, yokes for said intermediate wheels, each yoke being pivotal about a fixed axis at right angle to the axis of the pertaining intermediate wheel, and at an angle to the alined axes of the driving and driven wheels, a stud carried by the yoke in the axis of the intermediate wheel supported by said yoke, said stud being provided with a cylindrical surface, a bushing having an end face resting on the cylindrical surface, means for supporting the intermediate wheels from said bushings, the cylindrical surface having as axis the axis of pivotal movement for the supporting yoke of the intermediate wheels.

3. A change speed gear, comprising coaxially disposed driving and driven shafts, driving and driven wheels mounted on said shafts, intermediate wheels disposed for frictional engagement with said driving and driven wheels respectively, yokes located on opposite sides of the alined axes of the driving and driven wheels, fixed pivots parallel to each other for oscillatably supporting said yokes about an axis intersecting the axis of the intermediate wheels and at right angle to the alined axes of the driving and driven shafts, a stud carried by the yoke in alinement with the axis of the intermediate wheel supported on the yoke, said stud being provided with a cylindrical end surface projecting from the yoke and curved about an axis coinciding with the pivotal axis of the yoke, a bushing resting on the cylindrical surface for swinging movement, ball bearings interposed between said bushing and the intermediate wheels supported by the yoke, and means on the yoke for limiting the rocking movement of the bushing on the cylindrical surface in predetermined direction.

JAKOB ARTER.